United States Patent
Stock et al.

(10) Patent No.: US 9,429,317 B2
(45) Date of Patent: Aug. 30, 2016

(54) WASTEWATER EVAPORATION APPARATUS AND METHOD

(76) Inventors: Edward Stock, Rio Rancho, NM (US); James Stock, Bloomfield, NM (US)

( * ) Notice: Subject to any disclaimer, the term of this patent is extended or adjusted under 35 U.S.C. 154(b) by 732 days.

(21) Appl. No.: 13/110,832

(22) Filed: May 18, 2011

(65) Prior Publication Data

US 2012/0079971 A1    Apr. 5, 2012

Related U.S. Application Data

(60) Provisional application No. 61/390,131, filed on Oct. 5, 2010.

(51) Int. Cl.

| | |
|---|---|
| *B01D 1/14* | (2006.01) |
| *B01D 1/16* | (2006.01) |
| *B01D 1/20* | (2006.01) |
| *F23G 5/40* | (2006.01) |
| *F23G 7/00* | (2006.01) |
| *B01D 1/00* | (2006.01) |

(52) U.S. Cl.
CPC . *F23G 5/40* (2013.01); *B01D 1/14* (2013.01); *F23G 7/008* (2013.01); *B01D 1/0058* (2013.01); *B01D 1/16* (2013.01); *B01D 1/20* (2013.01); *Y02W 10/37* (2015.05)

(58) Field of Classification Search
CPC ............ B01D 1/16; B01D 1/18; B01D 1/20; B01D 1/14; B01D 1/0058
USPC ............ 159/22, 25.1, 25.2, 28.1, 28.2, 28.3, 159/28.4, 28.5, 28.6
See application file for complete search history.

(56) References Cited

U.S. PATENT DOCUMENTS

| | | | | |
|---|---|---|---|---|
| 2,224,076 | A | * | 12/1940 | Gatzweiler .................. 159/16.1 |
| 2,267,576 | A | * | 12/1941 | Rhodes .......................... 232/55 |
| 2,429,112 | A |   | 10/1947 | Warren |
| 2,825,680 | A | * | 3/1958  | Stutz ............................ 202/200 |
| 3,240,265 | A |   | 3/1966  | Weller |
| 3,301,998 | A |   | 1/1967  | Trickey |
| 3,351,119 | A | * | 11/1967 | Rosenblad .................. 159/13.3 |
| 3,501,381 | A |   | 3/1970  | DeLano |
| 3,642,583 | A | * | 2/1972  | Greenberg et al. ........... 588/314 |
| 3,878,887 | A |   | 4/1975  | Best |
| 4,151,046 | A |   | 4/1979  | Eidelberg |
| 4,159,629 | A |   | 7/1979  | Korr et al. |
| 4,274,365 | A | * | 6/1981  | Peters ............................ 119/78 |
| 4,415,460 | A | * | 11/1983 | Suciu et al. .................. 210/754 |
| 4,534,828 | A | * | 8/1985  | Erickson et al. ............ 159/16.1 |

(Continued)

FOREIGN PATENT DOCUMENTS

| | | |
|---|---|---|
| DE | 3508615 | 9/1986 |
| GB | 2239308 | 6/1991 |

(Continued)

*Primary Examiner* — Renee E Robinson
*Assistant Examiner* — Jonathan Pilcher
(74) *Attorney, Agent, or Firm* — Isaac Estrada; Philip D. Askenazy; Peacock Myers, P.C.

(57) ABSTRACT

An apparatus and method for evaporating a liquid and incinerating pollutants present in the resulting vapor. The system includes a chamber for containing a liquid, a floatable pan in the chamber with at least one opening to allow a portion of the liquid to enter into a basin of the pan, a heating element at least partially sumergeable in the liquid in the basin of the pan for evaporating the liquid, and a blowing burner to incinerate pollutants present in the evaporated liquid.

8 Claims, 15 Drawing Sheets

(56) References Cited

U.S. PATENT DOCUMENTS

| | | | |
|---|---|---|---|
| 4,658,868 A | 4/1987 | Word | |
| 4,693,304 A * | 9/1987 | Volland | 165/88 |
| 4,976,210 A * | 12/1990 | Dewald | 110/246 |
| 5,082,525 A * | 1/1992 | Travis | 159/16.1 |
| 5,221,523 A * | 6/1993 | Miles et al. | 422/182 |
| 5,381,742 A | 1/1995 | Linton et al. | |
| 5,399,299 A | 3/1995 | Stengel et al. | |
| 5,814,192 A | 9/1998 | Pittmon et al. | |
| 6,176,101 B1 | 1/2001 | Lowenstein | |
| 6,200,428 B1 * | 3/2001 | VanKouwenberg | 202/160 |
| 6,543,252 B1 | 4/2003 | Fuentes et al. | |
| 6,651,435 B1 * | 11/2003 | Johnston | 60/641.11 |
| 6,802,360 B1 | 10/2004 | Schmitt | |
| 7,162,923 B1 * | 1/2007 | Masoner et al. | 73/290 R |
| 7,340,845 B2 * | 3/2008 | Kneebone | 34/60 |
| 8,425,666 B2 * | 4/2013 | Batty et al. | 95/235 |
| 8,568,557 B2 * | 10/2013 | Duesel et al. | 159/16.2 |
| 2004/0045681 A1 | 3/2004 | Bolton et al. | |
| 2006/0082112 A1 * | 4/2006 | Blackburn | 280/736 |
| 2007/0246414 A1 | 10/2007 | Page et al. | |
| 2008/0110417 A1 | 5/2008 | Smith | |
| 2008/0257236 A1 * | 10/2008 | Green | 110/215 |
| 2008/0272506 A1 * | 11/2008 | Duesel et al. | 261/136 |
| 2009/0032467 A1 | 2/2009 | Albert | |
| 2011/0168646 A1 * | 7/2011 | Tafoya | 210/774 |

FOREIGN PATENT DOCUMENTS

| | | |
|---|---|---|
| GB | 2252739 | 8/1992 |
| SU | 1020712 | 5/1983 |

* cited by examiner

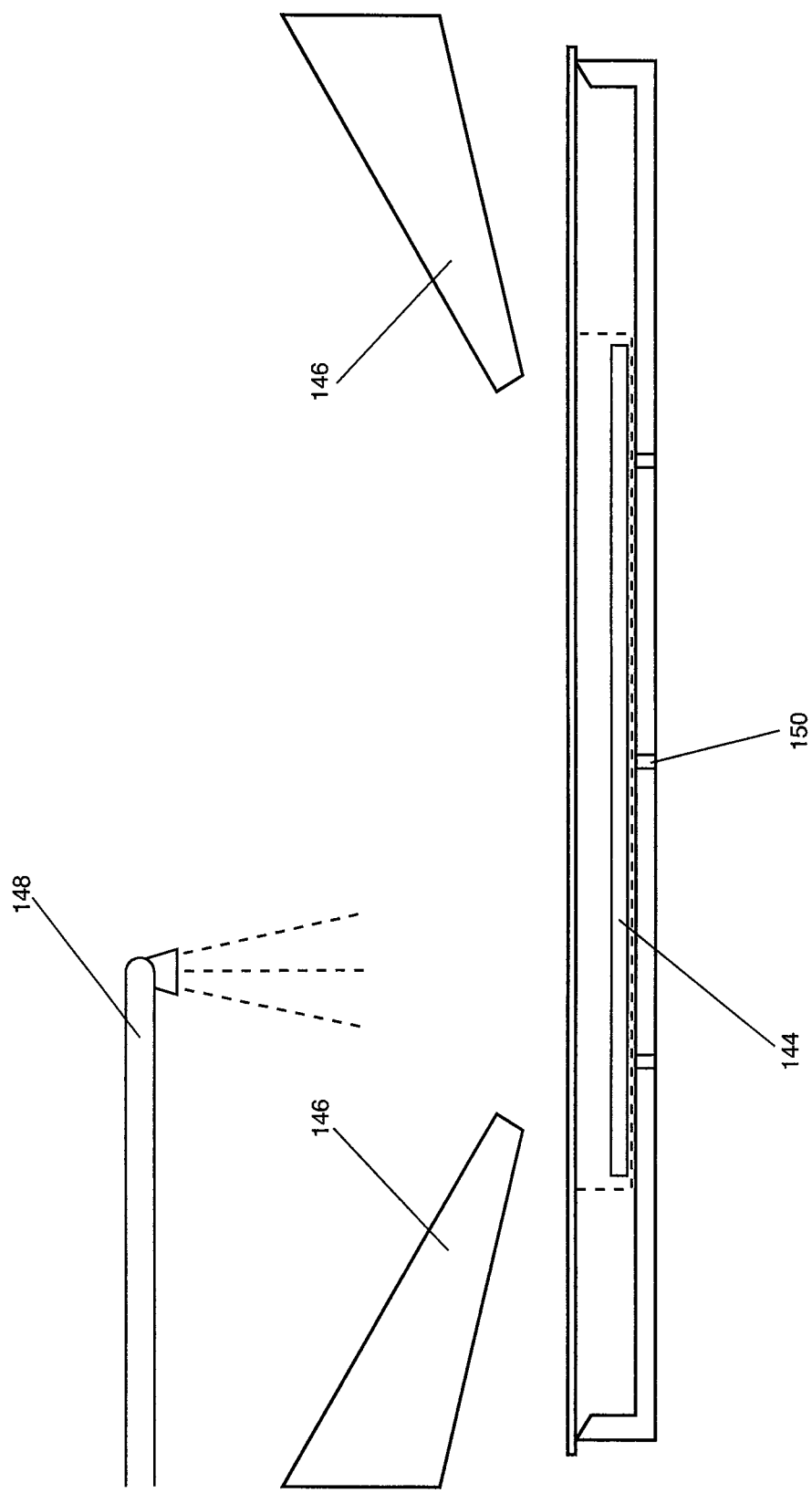

WASTEWATER EVAPORATION APPARATUS AND METHOD

CROSS-REFERENCE TO RELATED APPLICATIONS

This application claims priority to and the benefit of the filing of U.S. Provisional Patent Application Ser. No. 61/390,131, entitled "EVAPORATION APPARATUS AND METHOD", filed on Oct. 5, 2010, and the specification and claims thereof are incorporated herein by reference.

BACKGROUND OF THE INVENTION

1. Field of the Invention (Technical Field):

The present invention relates generally to evaporation of liquids and more particularly to evaporative incineration of wastewater.

2. Description of Related Art:

Evaporative wastewater incineration is a process useful for the disposal of wastewater.

In the past few decades, the oil and gas production industry has sought to develop a system that can dispose of the produced wastewater on site without success. This lack of success has primarily been because the systems tested so far were attempting to heat up all the water in a holding pit to evaporate it. These systems could not evaporate all the wastewater in the pit and were producing water vapor with hydrocarbon pollutants in it.

Embodiments of the present invention solve this problem by evaporating only a small portion of the liquid in a storage container at a time. This predetermined volume downsizing is preferably accomplished through metering systems. Embodiments of the present invention use energy that is available on site, and which may otherwise be wasted; reduce carbon footprint in conjunction with the evaporation of wastewater by incinerating hydrocarbon pollutants in the water and the exhaust of internal combustion compressor engines; and produce byproducts that are marketable.

BRIEF SUMMARY OF THE INVENTION

The present invention is of an evaporation apparatus comprising a chamber for containing a liquid, a floatable pan to be disposed in the chamber comprising at least one opening to allow a portion of the liquid to enter a basin of the pan, a heating element at least partially sumergeable in the liquid in the basin of the pan for evaporating the liquid, and a blowing burner to incinerate pollutants present in the evaporated liquid. In one embodiment, the evaporation system comprises one or more hollow pipes for transporting a heating material in the heating element. The hollow pipes can transport hot gases, oils, water, steam, and/or molten salts. In one embodiment the hollow pipes transport exhaust gas and at least one of the hollow pipes comprises an opening to enable some of the liquid in the basin of the pan to enter the hollow pipes, mix with the exhaust gas, and be transported to a baffle where the exhaust gas is scrubbed. In one embodiment the baffle is positioned relative to the pan in such a way that liquid exiting the baffle falls into the pan, and exhaust gas exiting the baffle purposefully agitates the surface of the liquid in the pan to increase evaporation. Embodiments of the system further comprise a sprinkler that sprays water on the heating element, a fan, and an air inlet tower to increase air flow. In one embodiment the fan is integrated into the blowing burner to increase combustion. An alternate embodiment of the invention comprises one or more blowing burners that heat the heating element and agitate the surface of the liquid to be evaporated.

The invention is also of a method to evaporate liquids comprising floating a pan in a liquid, transferring a portion of the liquid into a basin of the pan, at least partially submerging a heating element in the liquid of the pan, heating the heating element, evaporating the portion of the liquid to form a vapor, and incinerating pollutants in the vapor. In one embodiment the heating element is hollow and the heating step comprises flowing a heating substance through the heating element. In one embodiment the heating substance is exhaust gas, which is mixed with the liquid to be evaporated, and scrubbed in a baffle. One embodiment comprises creating agitation on the surface of the liquid to be evaporated, for example, with the exhaust gas that is exiting the baffle. One embodiment comprises spraying a portion of the liquid to be evaporated over the heating element. One embodiment comprises blowing hot air on the surface of the liquid in the pan to purposefully agitate the surface of the liquid. In an alternate embodiment, one or more blowing burners are used to heat the heating element and agitate the surface of the liquid in the pan. One embodiment comprises increasing air flow through an air intake opening.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 15 is a side view cross section of an alternate embodiment of the evaporation system of the present invention.

DETAILED DESCRIPTION OF THE INVENTION

The present invention is an apparatus and method to evaporate liquid and incinerate pollutants in the liquid, including but not limited to those present in oil/gas production wastewater. An alternate embodiment of the present invention is capable of incinerating pollutants present in combustion engine exhaust.

As used throughout the specification and claims, a "blowing burner" means a device that generates an open flame using fuels such as natural gas, propane, acetylene, etc., and is preferably capable of mixing said fuel with air to increase combustion similar to a blowtorch, oxyacetylene torch, propane torch, etc.

Figure 1:
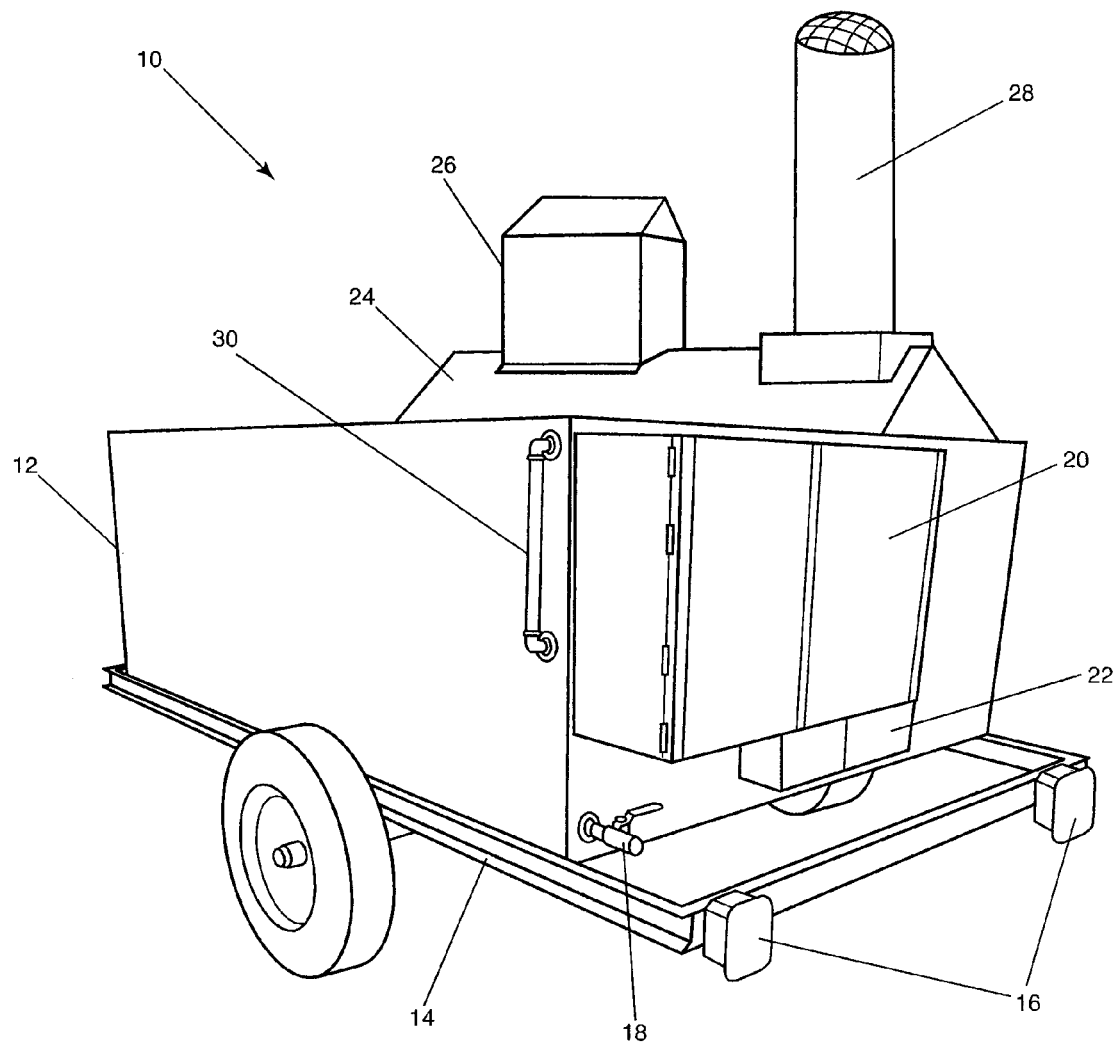
FIG. 1 is a side perspective view of the exterior of an embodiment of the evaporation system of the present invention.

Referring to the accompanying drawings, and particularly to FIG. 1, evaporation system 10 comprises container 12 preferably disposed on open trailer frame 14. Trailer frame 14 preferably comprises tail lights 16. Water drain 18 is preferably disposed on the back end of container 12. Also preferably disposed on the back of container 12 are utility box 20 and battery box 22, both of which comprise doors that can open for access to their interiors. The top of one side of container 12 preferably comprises removable pitched roof 24, which comprises air intake tower 26 and clean water vapor exit chimney 28. The top of the other side of container 12 preferably comprises a removable flat roof on it. Preferably, on one side of container 12 is water gage 30.

Evaporation system 10 can be transported to different locations as a trailer. Alternatively, evaporation system 10 can be installed in a fixed position at a location. One way to install evaporation system 10 in a fixed position is to transport it as a trailer and then remove the tires of the trailer at the location.

Figure 2:
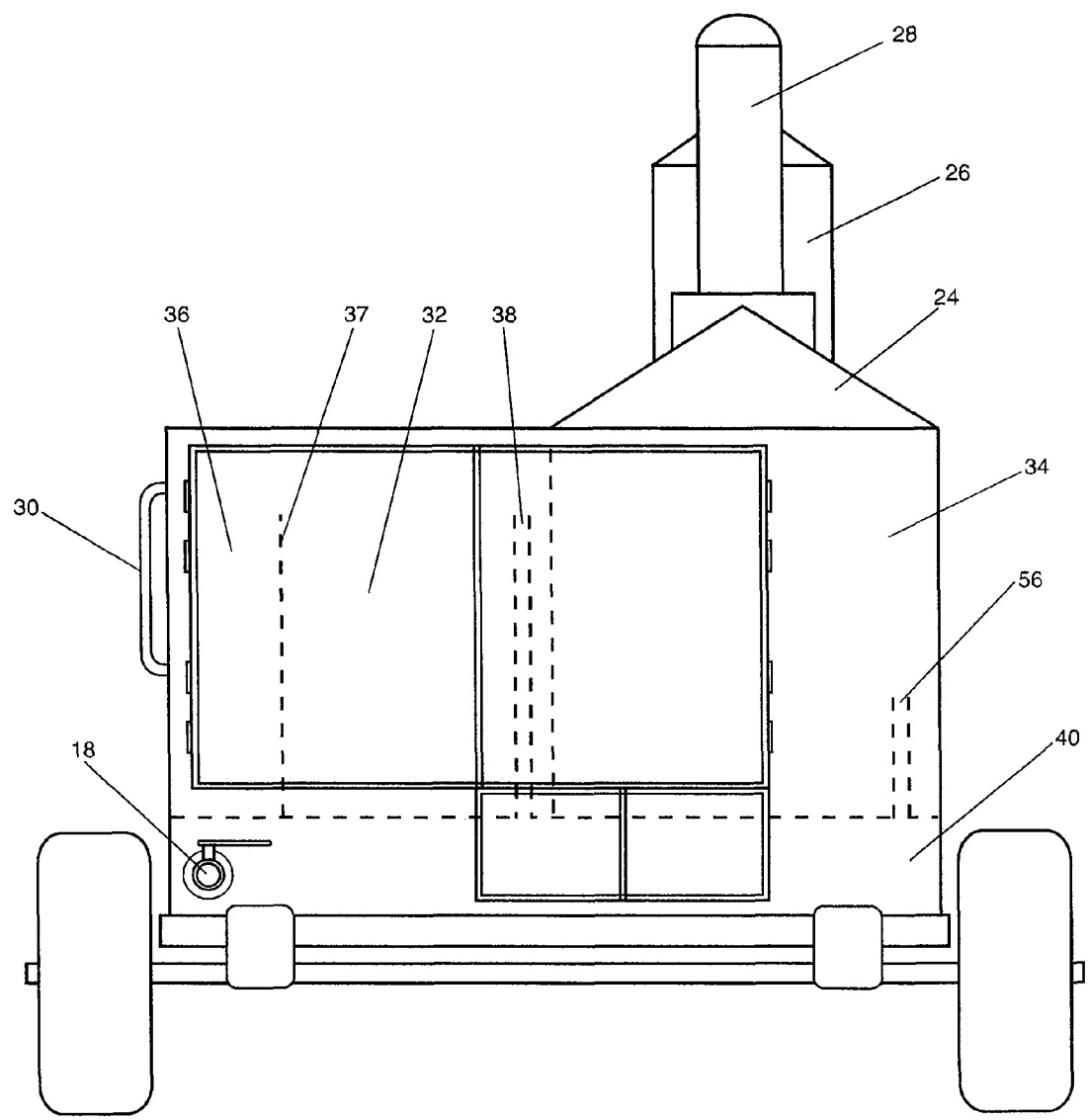
FIG. 2 is a back view of the exterior of the evaporation system of FIG. 1 showing certain preferable aspects of the interior of the system in dashed lines.
Figure 3:
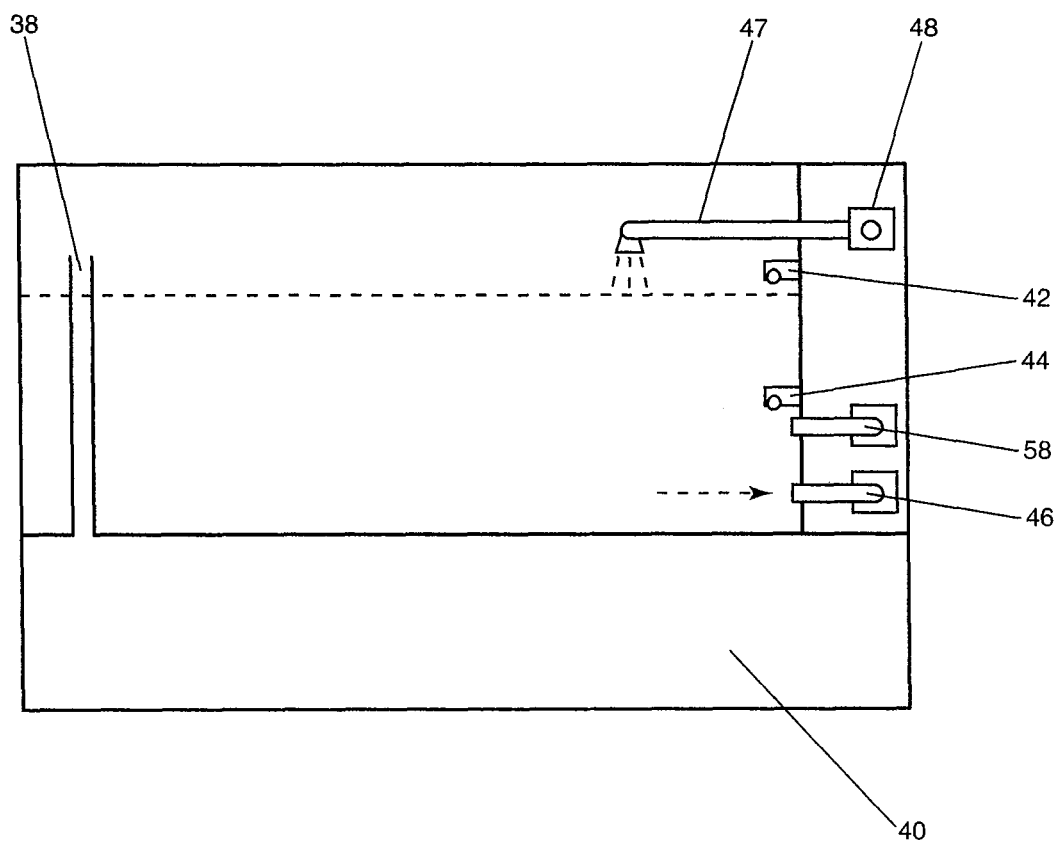
FIG. 3 is a side view cross section of the intake side of the evaporation system of FIG. 1.
Figure 4:
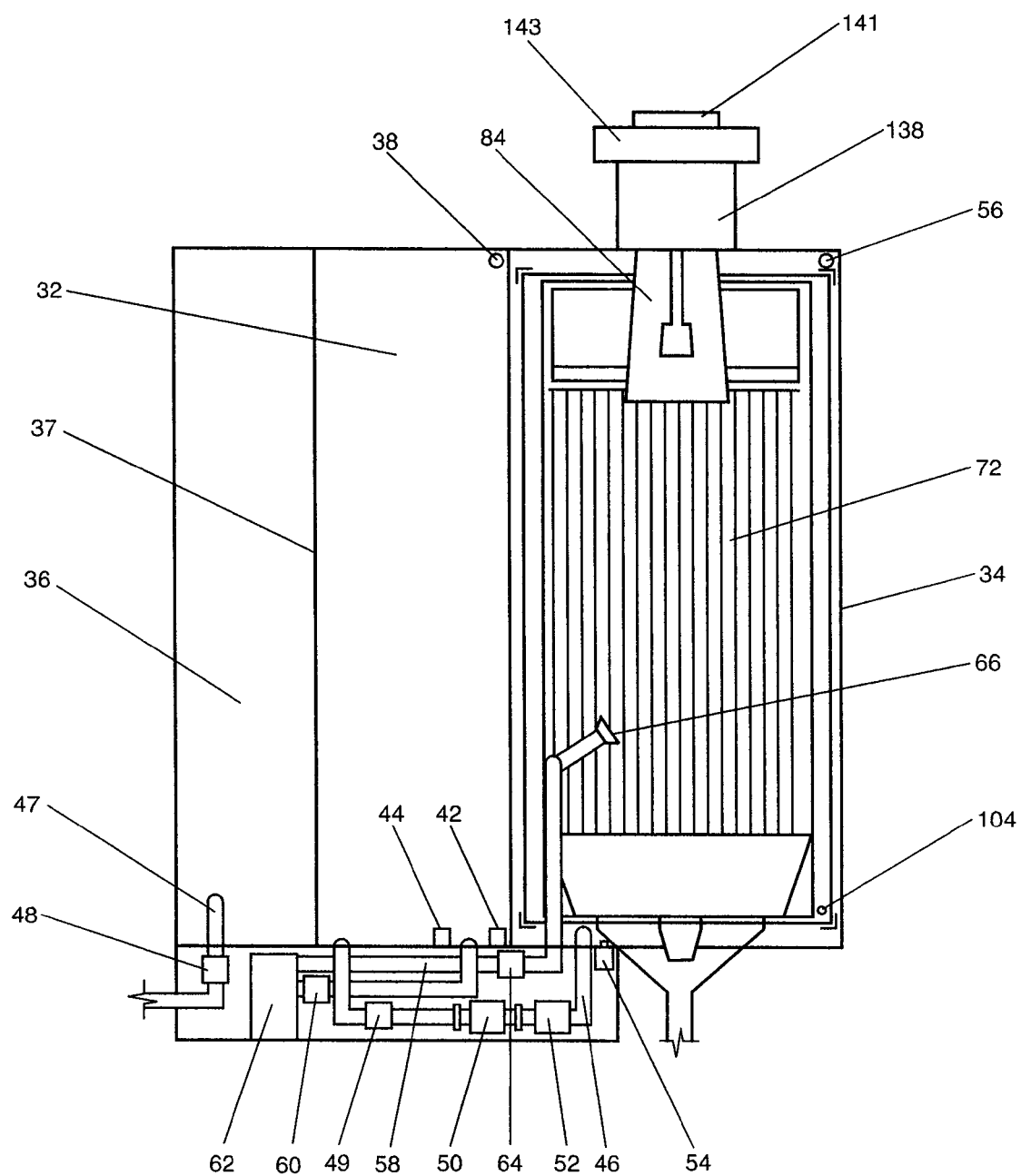
FIG. 4 is a top view cross section of the evaporation system of FIG. 1 showing the water transfer and control system.
Figure 5:
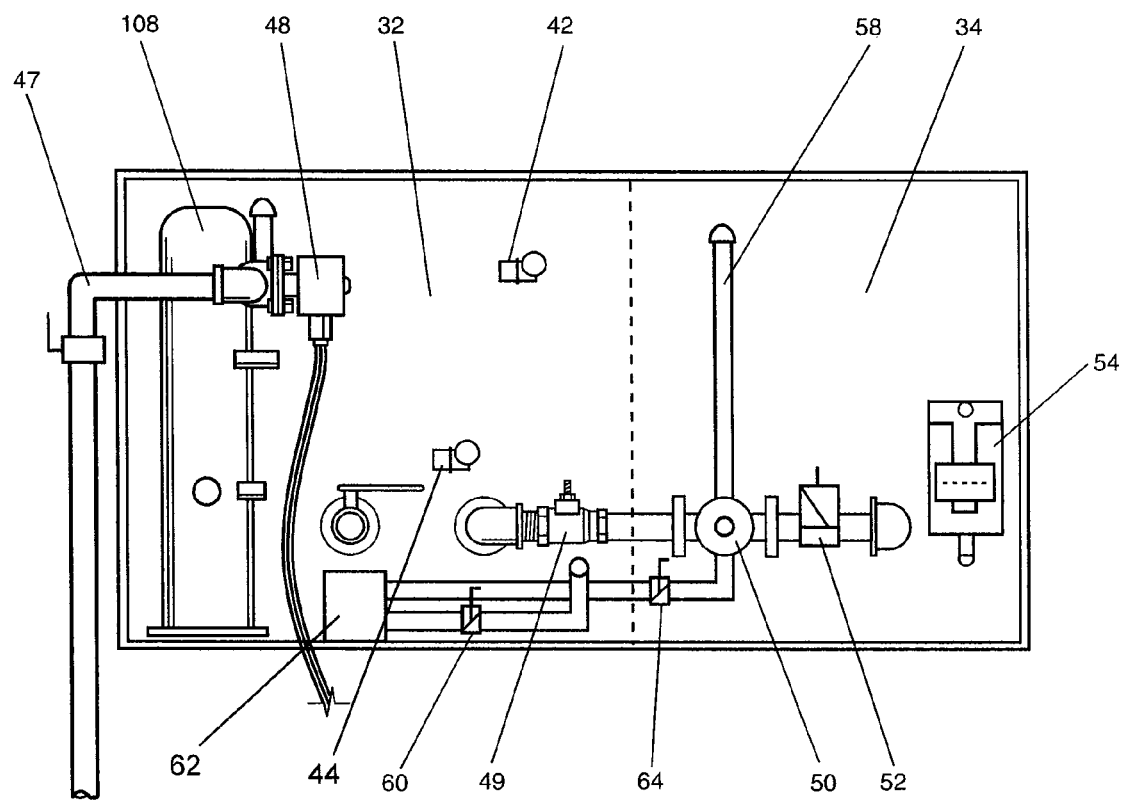
FIG. 5 shows the water transfer and control system in the interior of the utility box of the evaporation system of FIG. 1.

As shown in FIG. 2, the interior of container 12 preferably comprises a separate superior portion and an inferior portion. The top portion of the interior of container 12 comprises inlet tank 32 and combustion chamber 34. The inferior portion of the interior of container 12 comprises holding tank 40.

Referring to FIGS. 2-6, wastewater to be processed comes from a source tank (not shown) that connects to evaporation system 10 through wastewater supply pipe 47. Inlet tank 32 comprises high water level sensor 42 and low water level sensor 44. Supply water pipe 47 is connected to main water control valve 48, which preferably automatically opens when low water level sensor 44 indicates low water levels in inlet tank 32 and closes when high water level sensor 42 indicates inlet tank 32 is full. Wastewater enters inlet tank 32 through oil weir 36, in which oils stratify to an upper phase and water sinks to a lower phase. Oil weir 36 comprises dividing plate 37 that is perforated at its bottom end to enable wastewater but not oils to flow into the main storing portion of intake tank 32 while keeping floating oils separate in oil weir 36. These oils, which consist primarily of paraffin, can be cleaned out of weir 36 during regular clean up and maintenance of the system and disposed of according to industry standards, or be transferred directly to the incineration chamber for their incineration. To prevent overflowing of inlet tank 32, as a backup to high water level sensor 42, the main storing portion of inlet tank 32 comprises vertical tank weir 38, which allows any wastewater in excess of a predetermined depth to fall into holding tank 40 disposed in the inferior portion of container 12. Water gage 30 can be used to determine the level of wastewater in intake tank 32.

The wastewater in inlet tank 32 flows into combustion chamber 34 through water pipe 46. The wastewater preferably passes through water crossover safety valve 49, water meter 50, and water crossover 12 volt valve 52. Water crossover safety valve 49 is a positive flow shutoff to guarantee no wastewater will flow into combustion chamber 34 during maintenance, an emergency, etc. Water meter 50 indicates the volume of wastewater that is transferred to combustion chamber 34. Combustion chamber 34 is filled with wastewater from inlet tank 32 to a predetermined depth, which is maintained through low water level float 54, which signals water crossover 12 volt valve 52 to open to allow wastewater from inlet tank 32 to flow into combustion chamber 34 through water pipe 46 when low water level in combustion chamber 34 is detected. Additionally, as a backup to water level float 54, vertical tank weir 56 inside combustion chamber 34 prevents overflowing by allowing any wastewater in excess of the predetermined depth to fall into holding tank 40 disposed in the inferior portion of container 12. Under normal operation, tank 40 is dry. However, any wastewater being transferred to tank 40 through vertical tank weir 38 or vertical tank weir 56 can be poured or pumped to the source tank through water drain 18.

In order to increase evaporation inside combustion chamber 34, wastewater is also preferably transferred from inlet tank 32 into combustion chamber 34 through sprinkler pipe 58 to sprinkler 66. Wastewater from sprinkler 66 is sprayed on heating element 72, which is at least partially sumergeable in the liquid in basin 69, as described in more detail below. To arrive at sprinkler 66 with enough pressure to be sprayed, the wastewater is pumped from inlet tank 32. Wastewater passes through safety valve 60 before going through diaphragm water pump 62, and then through safety valve 64 when being directed under pressure from diaphragm water pump 62 to exit through sprinkler 66 inside of combustion chamber 34. Both safety valve 60 and safety valve 64 are used for manual shutoff for maintenance, during an emergency, etc.

As shown in FIGS. 6-9, the wastewater is processed in combustion chamber 34. Floatable pan 68 floats on the wastewater contained in combustion chamber 34 and comprises at least one and preferably a plurality of openings 70 at the bottom of basin 69 of floatable pan 68. Openings 70 allow a predetermined amount of wastewater to enter into basin 69 of floatable pan 68 and come into contact with heating element 72, which fits within pan 68. When wastewater contacts heating element 72, either in floatable pan 68 or from sprinkler 66, it is evaporated.

Heating element 72 preferably comprises gas intake component 74, hollow pipe network 76, and baffle 78. Intake component 74 comprises intake holes 80 at one end and connects with hollow pipe network 76 at its other end. Hollow pipe network 76 connects at its opposite end to baffle 78. Heating element 72 comprises, when all its components are connected, an exterior that contacts the wastewater inside combustion chamber 34 for evaporation, and an interior through which heating material, such as hot gas, passes.

Heating element 72 can be heated, for example, via a heated gas passing through its interior. The heated gas can be, for instance, engine exhaust from the internal combustion compressor engines present at some oil/gas well sites, which have exhaust gases that are capable of heating hollow pipe network 76 from between approximately 200 to approximately 900 degrees Fahrenheit or more. Other heating substances can pass through a heating manifold with a network of pipes including but not limited to oils, molted salts, steam, etc. Other heating means are possible including but not limited to electrical resistance, solar, geothermal, chemical exothermic reactions, and so forth.

Figure 10:
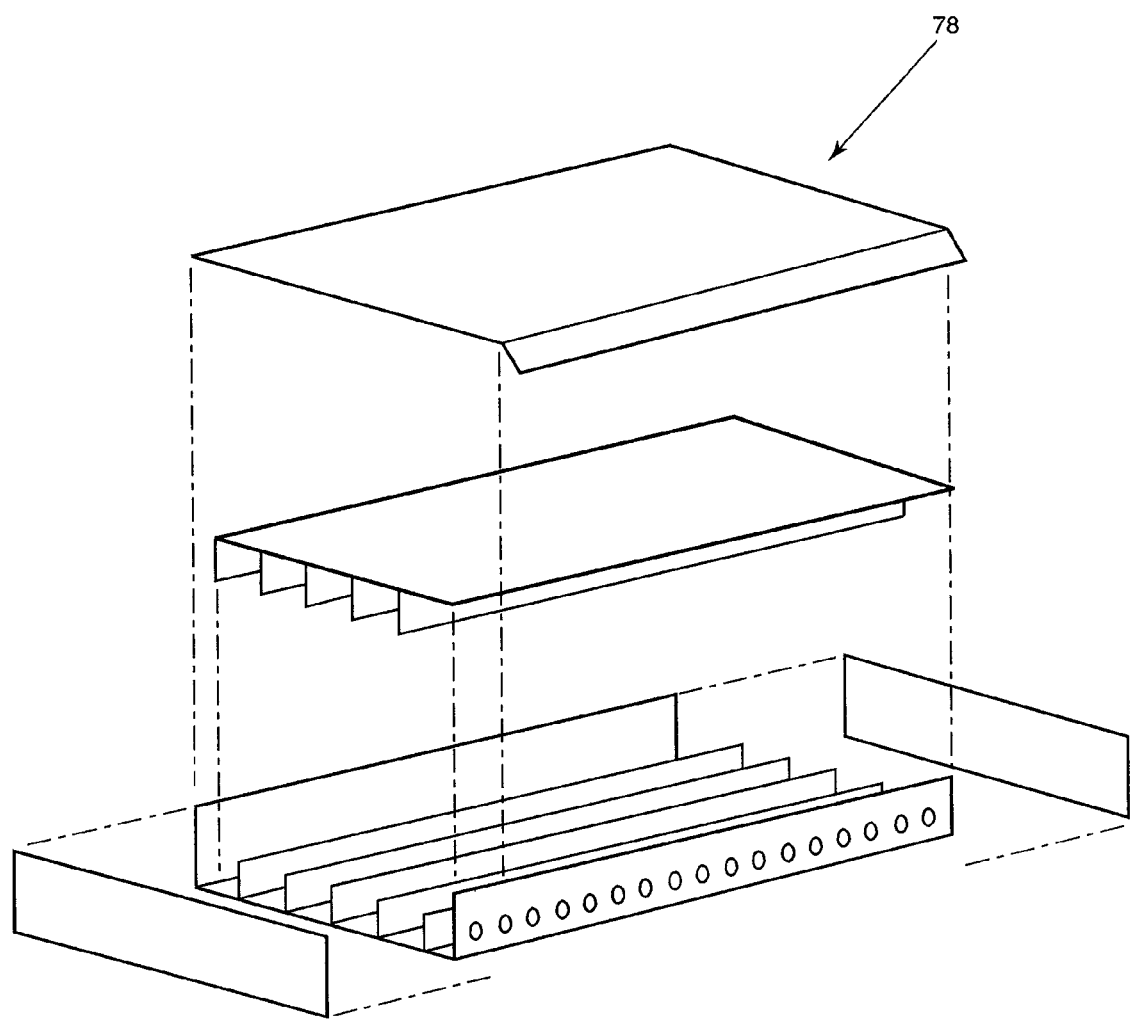
FIG. 10 is an exploded view of the baffle of the evaporation system of FIG. 1.

In order to begin evaporation, exhaust gases enter heating element 72 through at least one intake hole 80, and transfer heat to hollow pipe network 76. Hollow pipe network 76 comprises at least one and preferably a plurality of holes 77 on their bottom side. As wastewater to be evaporated fills in basin 69 of floating floatable pan 68, and makes contact with heating element 72, some of the wastewater (herein referred to as a second amount of wastewater) goes into the inside of hollow pipe network 76 through holes 77. This second amount of wastewater is then transported with the exhaust gases, in a mixture of exhaust gases and the second amount of waste water, into baffle 78 where it floods, or partially floods, the interior of baffle 78. The exhaust gases are scrubbed as they pass through flooded, or partially flooded, baffle 78, before exiting through baffle exit hole 82. As the exhaust gases exit through baffle exit hole 82, they carry some of the second amount of wastewater flooding baffle 78 back into basin 69. FIG. 10 shows an exploded view of baffle 78.

Baffle exit hole 82 may be purposefully placed such that any gases exiting through it are directed parallel to the water surface, moving away from baffle exit hole 82 and toward the end of floating floatable pan 68 where intake hole(s) 80 are located. This agitates the surface of the wastewater in basin 69 to create, for example, a ripple effect. The agitation of the surface of the wastewater to be evaporated causes it to contact more of the hot surface area of heating element 72, increasing the rate of evaporation. Alternatively, baffle 78 can be positioned upside down where baffle exit hole 82 is underwater in basin 69, which would enable baffle 78 to be filled with wastewater. Any scrubbed exhaust gas exiting baffle 78 would purposefully agitate the surface of the liquid in basin 69 as the exhaust gas bubbles up.

Figure 6:
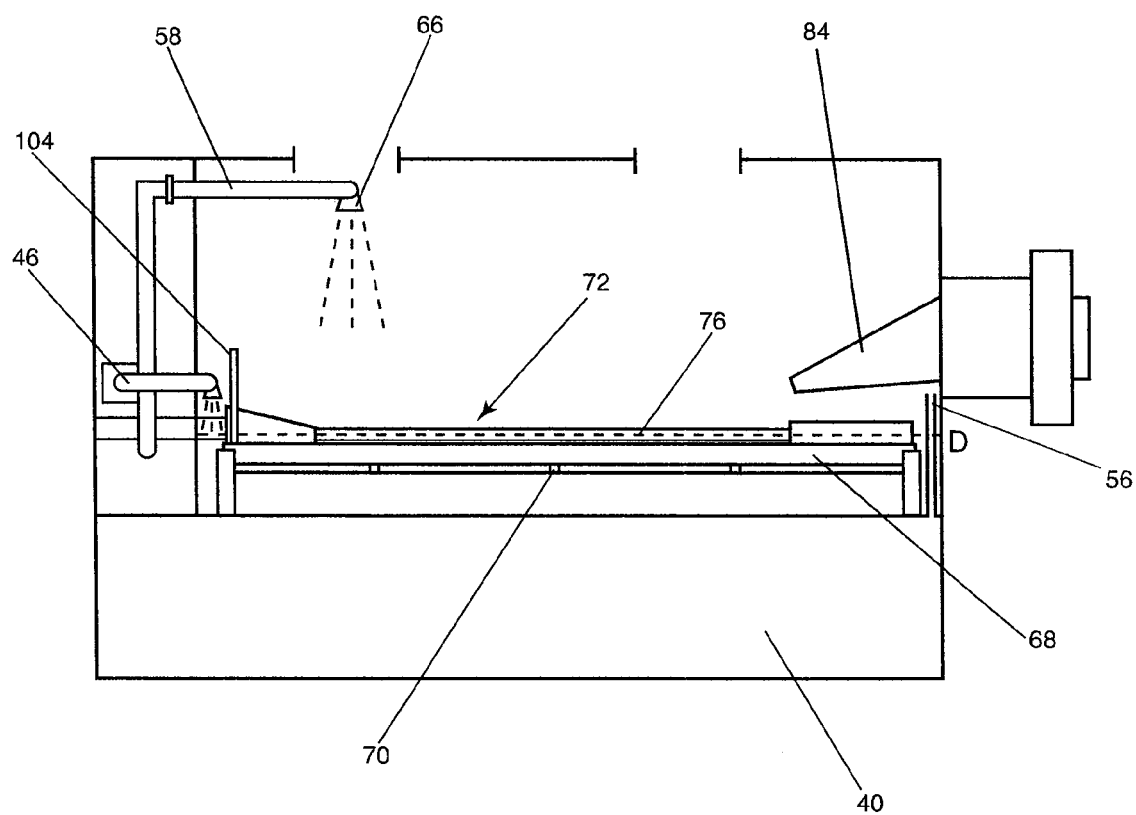
FIG. 6 is a side view cross section of the combustion chamber side of the evaporation system of FIG. 1.
Figure 7:
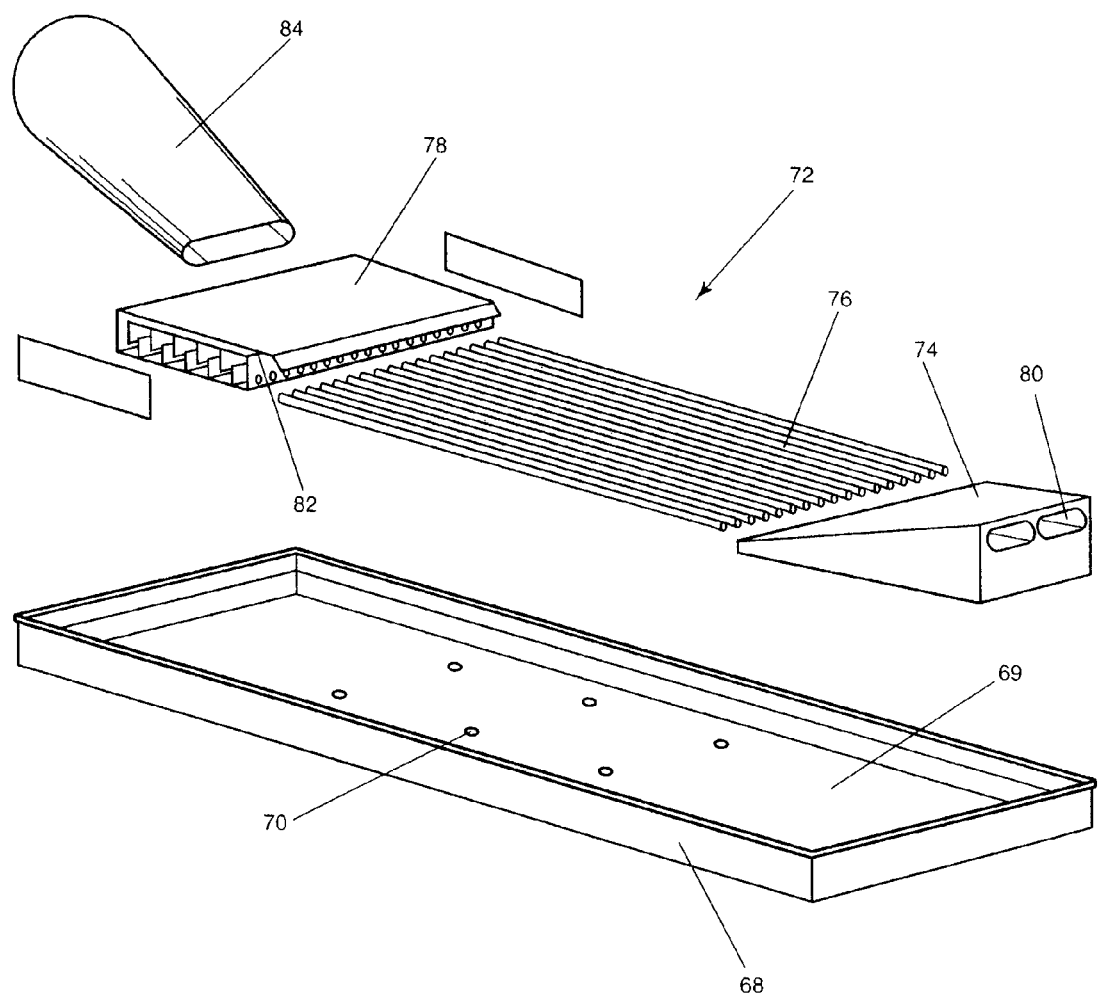
FIG. 7 is an exploded view of the heating element and floatable pan in the evaporation system of FIG. 1.
Figure 8:
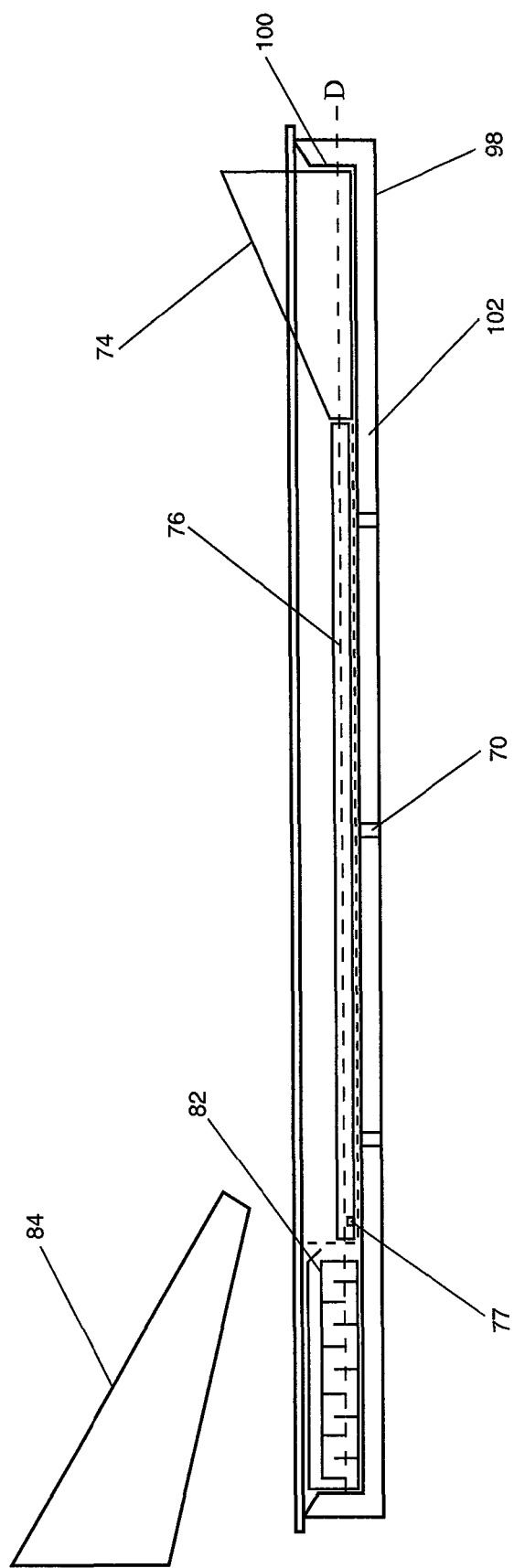
FIG. 8 is a side view cross section of the heating element and floatable pan of FIG. 7.
Figure 9:
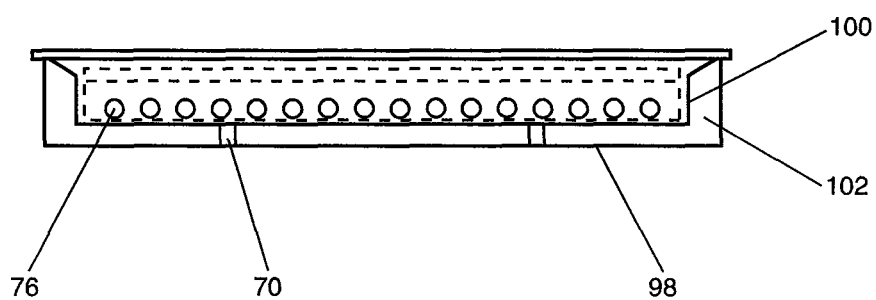
FIG. 9 is a front view cross section of the heating element and floatable pan of FIG. 7.

As shown in FIGS. 6 and 8, hollow pipe network 76 is preferably placed at a depth D in floatable pan 68 at which the entire pipe is not submerged in the wastewater. This allows the liquid to wick up on the exterior of hollow pipe network 76 increasing evaporation. When hollow pipe network 76 is positioned all the way under water, its temperature decreases and the rate of evaporation of wastewater decreases. The deeper hollow pipe network 76 is positioned in floatable pan 68, the greater its decrease in temperature and the lower the rate of evaporation. Thus, hollow pipe network 76 is preferably positioned so it is only partly submerged. Furthermore, because heating element 72 is in contact only with the relatively isolated wastewater in basin 69 of floatable pan 68, which is a small portion of the total liquid present in combustion chamber 34, the rate of evaporation for a given temperature of heating element 72 is highly increased.

In one embodiment, floatable pan 68 is constructed of a material that is resistant to extreme heat and corrosion, for example stainless steel or titanium. Floatable pan 68 is also constructed to act like a barge that holds some liquid in basin 69, which allows for the heating of a predetermined amount of liquid to the appropriate temperature for evaporation without heating the entire wastewater source in combustion chamber 34. The fluid depth D in basin 69 of floatable pan 68 is preferably maintained by sealed air space 102 between outer surface 98 and inner surface 100 at a pre-determined dimension set by the buoyancy of materials used in construction. This eliminates the need for additional controlling devices that would be otherwise required to maintain the flotation of floatable pan 68. This approach helps ensure that the system will keep working as long as there is fluid in combustion chamber 34 deep enough to enter through inlet tubes 70 in floatable pan 68. Optionally, sealed air space 102 can be filled with insulating material either during manufacturing or through pipe 104 (see FIG. 6).

Drawing the wastewater from below the surface through openings 70 in the bottom of floatable pan 68 prevents oil pollutants which are floating above the level of openings 70 from entering floatable pan 68. As wastewater contacting heating element 72 evaporates, it may still contain some pollutants, which travel in the vapor. Incineration system 10 comprises blowing burner 84 which preferably produces flames to incinerate contaminants contained in wastewater vapor. Furthermore, when scrubbed exhaust gas exits baffle exit hole 82, it too encounters blowing burner 84, which preferably "superheats" the scrubbed exhaust gas to further reduce noxious emissions, thereby preferably avoiding EPA constraints and cap and trade taxes due to carbon footprint. Water vapor virtually free of contaminants then exits combustion chamber 34 through vapor exit chimney 28.

In addition, blowing burner 84 preferably comprises fan 83, which increases combustion and creates air flow in combustion chamber 34. This air flow is preferably directed toward the water surface to create or enhance wastewater surface agitation and thereby increase evaporation. In addition to the fan and the baffle exhaust configuration, other optional ways to create agitation on the surface of the wastewater in basin 69 can include, but are not limited to, vibration, ultrasound, etc. Agitation on the surface of the liquid will produce more evaporation as more heated surfaces in the device come into contact with the liquid.

Figure 11:
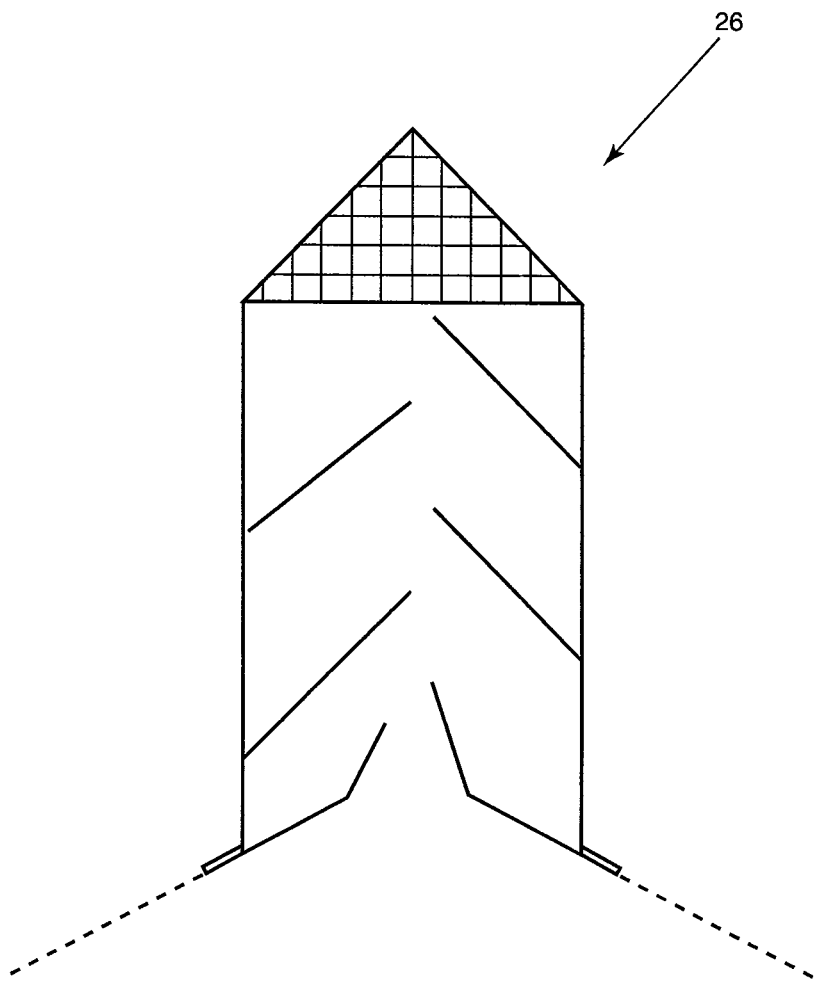
FIG. 11 shows a cross section of the air intake tower of the evaporation system of FIG. 1.

Another way that combustion in combustion chamber 34 and airflow are increased in the system is through air intake tower 26. A cross section of air intake tower 26 is shown in FIG. 11. The baffle inside air intake tower 26 helps to ensure that no flames from blowing burner 84 exit the system through air intake tower 26. Combustion chamber 34 also preferably comprises removable pitched roof 24 to improve water vapor and air flow. Additionally, with this design any water condensate drips to the side walls of combustion chamber 34 rather than dripping on heating element 72.

Figure 12:
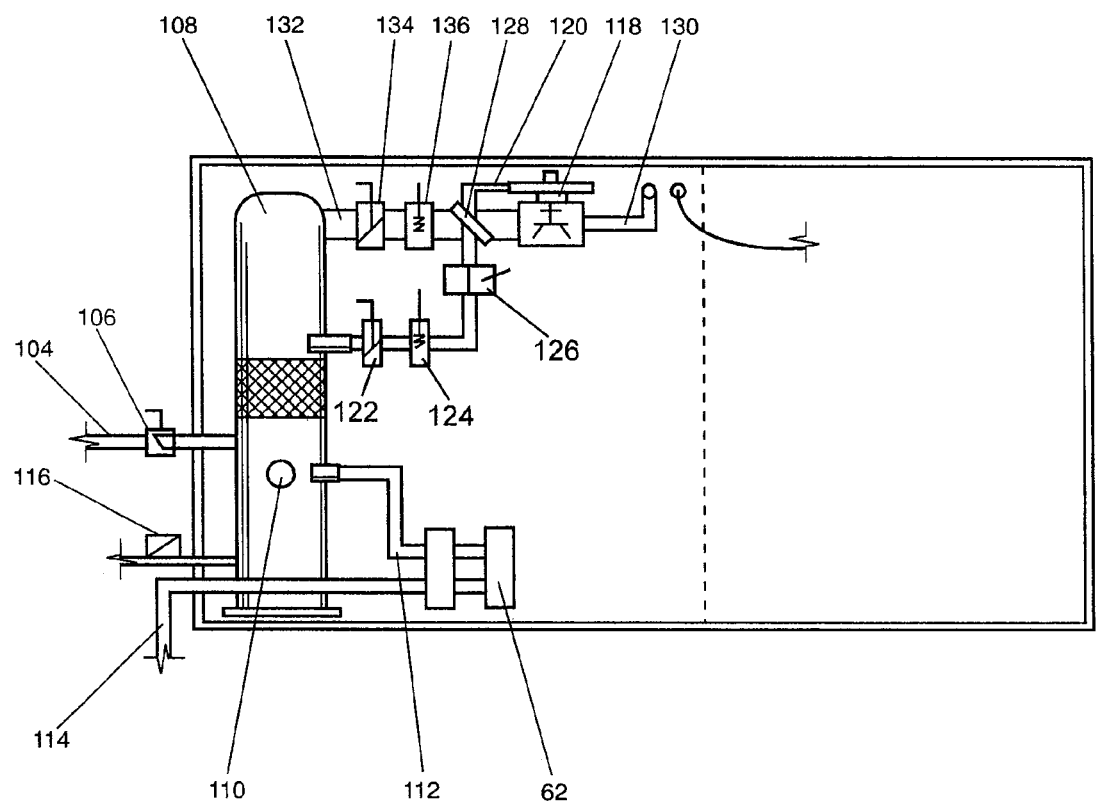
FIG. 12 shows the fuel transfer and control system in the interior of the utility box of the evaporation system of FIG. 1.

Blowing burner 84 can be operated with natural gas from a gas/oil well, or can be operated with propane gas, or other similar fuels, stored in a tank. As shown in FIG. 12, the fuel to operate blowing burner 84 enters incineration system 10 under pressure through supply gas pipe 104, passing through main supply shutoff valve 106 and connects the fuel source (e.g. compressor engine supply, propane tank, etc.) with gas dryer 108. Gas dryer 108 preferably comprises gage 110 which indicates the gas pressure inside dryer 108. Pressurized wet gas in the bottom side of gas dryer 108 is preferably used to run diaphragm water pump 62 through gas pipe 112. The gas used to run diaphragm water pump 62 is then returned to the fuel source through gas pipe 114. Wet gas in gas dryer 108 can be drained through wet gas drain 116 when needed.

Main fuel motor valve 118 controls the fuel flowing from gas dryer 108 to blowing burner 84. Gas pipe 132 connects gas dryer 108 and main fuel motor valve 118. Gas pipe 130 connects main fuel motor valve 118 and burner 84. Before reaching main fuel motor valve 118, fuel preferably passes through main fuel safety shutoff valve 134 and main fuel regulator 136. Safety shutoff valve 134 is disposed on pipe 132 for manual shutoff for maintenance, during an emergency, etc. Fuel regulator 136 is disposed on pipe 132 to regulate the pressure of fuel reaching burner 84.

Pressurized dry gas is used to partially open main fuel motor valve 118 through gas pipe 120. To arrive at main fuel motor valve 118, the fuel preferably passes through fuel control safety valve 122, fuel control regulator valve 124, field control solenoid valve 126, and slow flow 128. Safety valve 122 is disposed on gas pipe 120 for manual shutoff during maintenance, in case of emergency, etc. Fuel control regulator valve 124 regulates the gas pressure down from between approximately 20 to 30 pounds to approximately 12 pounds. Field control solenoid valve 126 is an electrically actuated valve that allows a small amount of fuel to pass in conjunction with slow flow 128 toward main fuel motor valve 118 so that very small pressure slowly builds up and a diaphragm inside fuel motor valve 118 slowly opens allowing a small amount of fuel from dryer 108 to pass to blowing burner 84 through gas pipe 130. A burner management system (BMS), such as the SureFire™ sparkless electric lighter BMS, ignites the small amount of fuel inside blowing burner 84. Because the fuel is only a portion of slow flowing fuel, this first ignition does not start blowing burner 84 at full capacity. A flame sensor in burner 84 then signals to main fuel motor valve 118 to fully open so that more fuel can pass and burner 84 can operate at full capacity.

Figure 13:
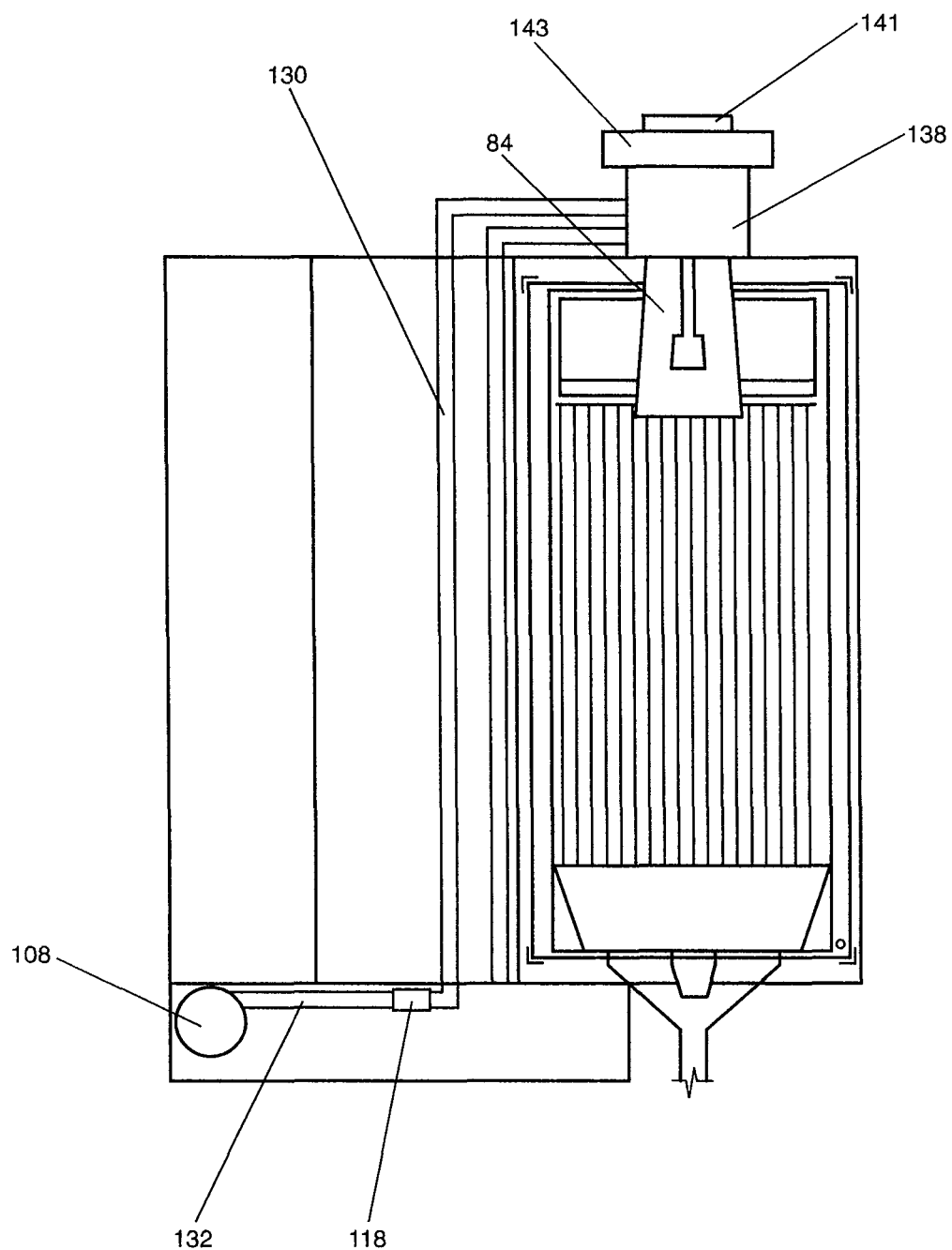
FIG. 13 is a top view cross section of the evaporation system of FIG. 1 showing a selected number of components of the fuel transfer and control system.
Figure 14:
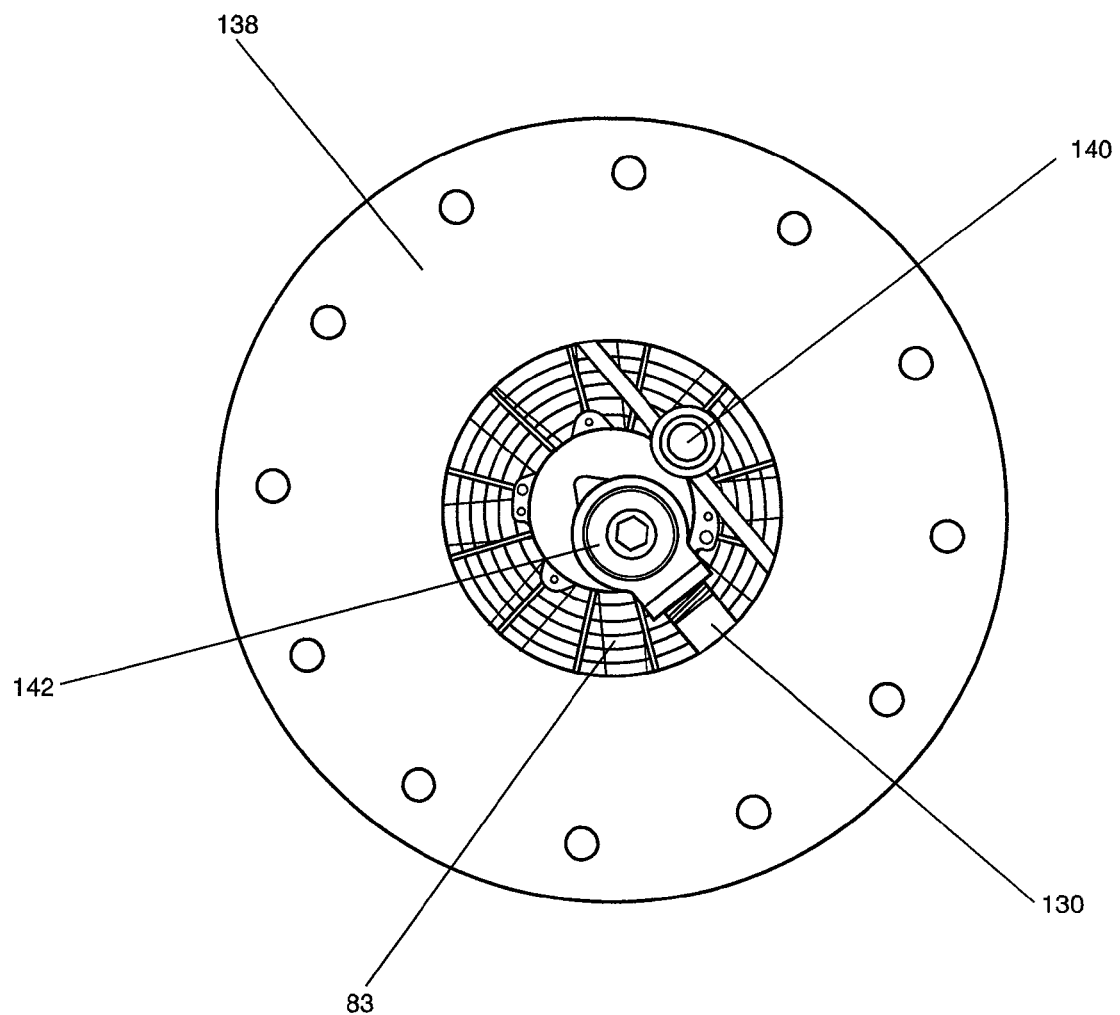
FIG. 14 is a front view of the spark arrestor housing of the evaporation system of FIG. 1 without the spark arrestor and view port cover.

As shown in FIGS. 13-14, incorporating fan 83 into the BMS's spark arrester's housing 138 provides airflow across burner 84, increasing flame integrity and enhancing burn. The air flow provided by fan 83 also prevents back flash around air/gas mixer 142. The fan is preferably capable of blowing at least 500 cfm of airflow. Enhanced burner flame increases heat to flame ratio, raising BTUs similar to the afterburner of a ramjet engine. The BMS/fan system comprises view port 140 for visual inspection of the flame in blowing burner 84, view port cover 141 to cover view port 140 when not in use, fuel air mixer 142 to mix fuel with air, and spark arrester 143 to prevent the flame from escaping out of the BMS/fan system if fan 83 stops working, etc.

Preferably the combustion chamber is cleaned of salts accumulated on the surfaces therein periodically. The salts extracted from the combustion chamber during these cleaning procedures can be sold for a variety of industrial purposes. Wastewater with high salts content may require cleaning of the system more often than when the wastewater salts concentration is low. Alternatively, the wastewater holding capacity of combustion chamber 34 can be increased so that the ratio of salts to wastewater to be processed is maintained at a lower level for a longer period of time, reducing salt cleaning demand. One way in which the holding capacity of combustion chamber 34 can be increased is to unite combustion chamber 34 and holding tank 40 by perforating or otherwise opening a portion of the bottom wall of combustion chamber 34 to connect combustion chamber 34 with holding tank 40. Although this would eliminate the overflow backup system of weirs 38 and 56, the wastewater level in inlet tank 32 and combustion chamber 34 can still be maintained through high water level sensor 42 and water level float 54 respectively.

When wastewater has a higher content of corrosive agents, for example those present in water from sour gas producing wells, parts and components of the system that come into contact with wastewater can be manufactured of a material more resistant to corrosion such as stainless steel.

With reference to FIG. 15, other embodiments of the present invention are useful in locations where no compressor engines are present, and therefore no exhaust gases are available. These embodiments may comprise heating element 144 such as a pipe network, a perforated plate, or other piece made of a material resistant to extreme heat and corrosion such as stainless steel. Heating element 144 can be heated with one or more blowing burners 146. Sprinkler 148 provides a mist of wastewater over heating element 144. The water in the tank is metered with a water metering system, such as a float valve, to optimize water depth in the combustion chamber. Heating element 144 fits in a floatable pan, which in turn floats on the wastewater. Wastewater enters the basin of the floatable pan through at least one hole, but preferably a plurality of holes 150. To increase evaporation, heating element 144 is preferably only partially submerged. The surface of the wastewater can be purposefully agitated with one or more blowing burners 146 that comprise a fan.

Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for evaporating liquid comprising:
floating a pan in a liquid to be evaporated in a chamber;
transferring a portion of the liquid to be evaporated into a basin of the pan;
at least partially submerging a hollow heating element in the liquid in the basin;
heating the heating element by flowing exhaust gas through it;
evaporating a first amount of the portion of the liquid in the basin to form a vapor;
incinerating pollutants in the vapor;
transferring a second amount of the portion of the liquid in the basin to the inside of the heating element;
mixing the exhaust gas with the second amount of the portion of the liquid inside the heating element;
transferring the mixture of exhaust gas and the second amount of the portion of the liquid to a baffle;
scrubbing the exhaust gas by passing the mixture through the baffle;
exiting the exhaust gas from the baffle; and
superheating the exhaust gas with a blowing burner.

2. The method of claim 1 further comprising blowing air over the liquid in the pan.

3. The method of claim 2 wherein blowing air agitates the surface of the liquid.

4. The method of claim 3 further comprising increasing air flow in the chamber via an air intake opening.

5. A method for evaporating liquid comprising:
floating a pan in a liquid to be evaporated in a chamber;
transferring a portion of the liquid to be evaporated into a basin of the pan;
at least partially submerging a hollow heating element in the liquid in the basin;
heating the hollow heating element by flowing exhaust gas through the heating element;
evaporating a first amount of the portion of the liquid in the basin to form a vapor;
incinerating pollutants in the vapor;
transferring a second amount of the portion of the liquid in the basin to the inside of the heating element;
mixing the exhaust gas with the second amount of the portion of the liquid inside the heating element;
transferring the mixture of exhaust gas and the second amount of the portion of the liquid to a baffle;
scrubbing the exhaust gas in the mixture with the second amount of the portion of the liquid by passing the mixture through the baffle;
exiting scrubbed exhaust gas from the baffle; and
agitating the surface of the portion of liquid in the basin with the scrubbed exhaust gas.

6. The method of claim 5 further comprising spraying liquid to be evaporated over the heating element.

7. The method of claim 5 further comprising blowing air on the surface on the portion of liquid in the basin to increase the agitating.

8. The method of claim 5 further comprising superheating the scrubbed exhaust gas to further reduce any contaminants in it.

* * * * *